(12) United States Patent　　　(10) Patent No.:　US 12,617,224 B2

Guzzo　　　　　　　　　　　　　　(45) Date of Patent:　　　May 5, 2026

(54) MULTI-LAYERED REVEALABLE SUBSTRATES AND METHODS OF PRODUCING AND USING SAID MULTI-LAYERED SUBSTRATES

(71) Applicant: VIRTUAL GRAPHICS, LLC, Easton, PA (US)

(72) Inventor: John V. Guzzo, Easton, PA (US)

(73) Assignee: VIRTUAL GRAPHICS, LLC, Easton, PA (US)

( * ) Notice: Subject to any disclaimer, the term of this patent is extended or adjusted under 35 U.S.C. 154(b) by 214 days.

(21) Appl. No.: 18/386,448

(22) Filed: Nov. 2, 2023

(65) Prior Publication Data

US 2024/0149601 A1　　May 9, 2024

Related U.S. Application Data

(60) Provisional application No. 63/537,287, filed on Sep. 8, 2023, provisional application No. 63/382,807, filed on Nov. 8, 2022.

(51) Int. Cl.
B41M 5/36　　　　(2006.01)
G06K 19/06　　　(2006.01)

(52) U.S. Cl.
CPC ......... B41M 5/366 (2013.01); G06K 19/0614 (2013.01); B41M 2205/04 (2013.01); B41M 2205/42 (2013.01)

(58) Field of Classification Search
CPC .............. B41M 5/366; B41M 2205/04; B41M 2205/42; G06K 19/0614
See application file for complete search history.

(56) References Cited

U.S. PATENT DOCUMENTS

| | | | |
|---|---|---|---|
| 8,054,323 | B2 | 11/2011 | Peters et al. |
| 9,757,968 | B1 | 9/2017 | Guzzo et al. |
| 10,427,440 | B2 | 10/2019 | Guzzo |
| 2010/0245524 | A1 | 9/2010 | Peters et al. |
| 2017/0337851 | A1 | 11/2017 | Guzzo et al. |
| 2021/0086542 | A1 | 3/2021 | Guzzo |

OTHER PUBLICATIONS

International Search Report for corresponding PCT application PCT/US2023/036692 dated Apr. 4, 2024.
International Preliminary Report on Patentability for corresponding PCT application PCT/US2023/036692 dated Apr. 29, 2024, including Written Opinion dated Apr. 4, 2024.

*Primary Examiner* — Gerard Higgins

(74) *Attorney, Agent, or Firm* — Norris McLaughlin, PA

(57)　　　　ABSTRACT

Multi-layered revealable substrates and methods of producing and/or using said substrates are disclosed herein and comprise a first layer of a first opacifying material, a first color material disposed on a first side of the first layer of the first opacifying material, wherein the first layer of the first opacifying material covers the first color material, and a second layer of a second opacifying material disposed on a side of the first color material that is located opposite with respect to the first layer of the first opacifying material. The first opacifying material is configured to, upon application of first predetermined energy, change from the opaque state to a transparent state to reveal the first color material underneath the first opacifying material, and the second opacifying material is configured to, upon application of second different predetermined energy, change from the opaque state to a transparent state.

6 Claims, 4 Drawing Sheets

MULTI-LAYERED REVEALABLE SUBSTRATES AND METHODS OF PRODUCING AND USING SAID MULTI-LAYERED SUBSTRATES

CROSS-REFERENCE TO RELATED APPLICATIONS

This non-provisional application claims priority to U.S. Provisional Patent Application Nos. 63/382,807 filed on Nov. 8, 2022, and 63/537,287 filed Sep. 8, 2023, which are incorporated herein by reference.

FIELD OF THE DISCLOSURE

The present disclosure relates to the field of printing and printable multi-layered substrates and improves upon the printing substrates and methods described in U.S. Pat. No. 8,054,323 and U.S. Pat. App. Pub. No. 2021/0086542, both incorporated herein by reference, in their entireties. More particularly, the present disclosure is directed to new multi-layered printing substrates, methods of producing and/or using said multi-layered printing substrates, and at least two opaque layers of said substrates that are disposed upon at least two colored materials or layers and are provided by one or more opaque polymers or polymer materials sensitive to at least one application of at least one selected from heat, pressure, light and/or laser energy, or a combination thereof. The one or more opaque polymers or polymer materials of the at least two opacifying layers may be induced to become transparent and reveal color material(s) (e.g., ink(s)) or thereunder. For example, a print head can transfer a first light/laser energy and/or thermal energy to portions of the multi-layered substrate to render at least one opaque polymer or polymer material of at least one opacifying layer of the at least two opacifying layers transparent at those portions, and thereby reveal a first color material or layer underlying the at least one opacifying layer at those portions. The print head may also transfer a second light/laser energy and/or thermal energy to portions of the multi-layered substrate to render the one or more opaque polymers or polymer materials of the at least two opacifying layers transparent that those portions, and thereby reveal at least one second color materials or layers underlying the at least two opacifying layer at those portions. As a result of the transfer of the first and second light/laser energies and/or thermal energies to the portions of the multi-layered substrate, a color mixture of the first color material or layer and the at least one second color materials or layers is revealed and displayed at the portions of the multi-layered substrate. In an embodiment, the first color material or layer may be blue, the at least one second color materials or layers may be yellow, and the color mixture may be green. The multi-layered substrates and methods disclosed herein may achieve improved color imaging and print head alignment, coordination, registration and/or re-registration by utilizing or implementing one or more of the systems and/or method described in U.S. Pat. No. 10,427,440 (hereinafter "the '440 patent"), incorporated herein by reference, in its entirety.

SUMMARY OF THE DISCLOSURE

The present disclosure is directed to multi-layered revealable substrates and methods of producing and/or using the said multi-layered substrates. Additionally, the present disclosure is directed to multi-layered revealable substrates that have at least two opaque or opacifying layers comprising one or more opaque polymers or polymer materials that may be transitionally induced from an opaque state to a transparent state for revealing one or more color materials and/or one or more colored layers below or beneath one or more opaque polymers or polymer materials of at least one opaque or opacifying layer of the at least two opaque or opacifying layers. The one or more opaque polymer or polymer materials of the at least two opaque or opacifying layers may be induced by heat, pressure, light/laser energy, and/or chemical reaction to become transparent and thereby reveal the color material(s) (e.g., ink(s)) or color layer(s) thereunder. The one or more opaque polymers or polymer materials of the at least two opaque or opacifying layers may be sensitive to light and/or laser energy, thermal energy or heat, a chemical, and/or pressure to define at least two light/laser-sensitive, thermally-sensitive, chemically-sensitive, and/or pressure-sensitive substrates. The one or more opaque polymers or polymer materials of the at least two opaque or opacifying layers may be induced to become transparent by being exposed to predetermined light and/or laser energy (i.e., one or more predetermined frequencies, intensities, and/or amounts of light and/or laser energy; hereinafter "light/laser energy"), heated at high temperature or to an elevated temperature (i.e., a temperature higher than an ambient temperature or other threshold), subjected to an increased pressure (i.e., in excess of atmospheric pressure), chemically reacted, or changed, and/or other transparency induction methods. As a result of applications of predetermined and/or sufficient light/laser energy, heating, pressure application, and/or chemical change, one or more of the at least two opaque or opacifying layers may become or transition to a transparent state and/or reveal the color material(s) or color layer(s) thereunder. More particularly, the one or more opaque polymers or polymer materials of the at least two opaque or opacifying layers comprise at least one plurality of spheroid polymer particles, at least one plurality of irregular or odd-shaped polymer particles, or a mixture thereof that may be transitionable or transitioned from an opaque state to a transparent state, wherein, upon transition, structures of the at least two opaque or opacifying layers at least partially collapse, change, modify and/or transition, thereby causing the at least two opaque or opacifying layers to transmit incident light instead of internally reflecting incident light.

In some configurations, first side surfaces of the multi-layered revealable substrates have color material(s), such as ink(s), and/or colored layers substantially bordering and/or covering the first side surfaces, in their entireties or at least partially. The color material(s) (e.g., ink(s)) and/or colored layer(s) may be of any single color and/or multiple colors as desired for printing or imaging. In one or more embodiments, the color material(s) and/or ink(s) disclosed herein may be, may comprise, or may consist of one or more opaque inks, one or more translucent and/or transparent inks, one or more colored opaque inks, one or more colored translucent and/or transparent inks, or at least one combination thereof. In at least one embodiment, the color material(s) and/or colored layer(s) may comprise a plurality of different or similar colors, wherein at least one color of the different or similar colors is revealed upon transition of the one or more opaque or opacifying layers (i.e., one or more opaque polymers or polymer materials) from opaque state(s) to transparent state(s). Further, the multi-layered revealable substrates may have at least two opacifying materials and/or layers (hereinafter "the opacifying layers") that cover, obscure, and/or block the color material(s) (e.g., ink(s)) and/or the colored layer(s) on the first side surfaces of the multi-layered revealable substrates. As a result, the opacifying layers, when viewed prior to any induced transparency, obscure, block, and/or cover the color material(s) (e.g., ink(s)) and/or the colored layer(s) on the first side surfaces. The opacifying layers provide second side surfaces of the multi-layered revealable substrates that only show or appear as at least one opaque color, such as, for example, white and/or one or opaque colors. It is only upon application of predetermined heats, pressures and/or light/laser energies that the color material(s) (e.g., ink(s)) and/or the colored layer(s) on the first side surfaces is revealed and/or viewable. Each opacifying layer comprises at least one opaque polymer or polymer material. In some embodiments, the opacifying layers comprise one or more spherical and/or non-spherical polymer particles that may or may not have an opaque color. In some such embodiments, the one or more spherical and/or non-spherical polymer particles may have the opaque color that may be induced to become transparent. In other embodiments, the one or more spherical and/or non-spherical polymer particles may be or comprise one or more spherical-shaped particles, one or more rod-shaped particles, one or more flake-shaped particles, or combinations thereof that may be induced to become transparent.

In one or more embodiments, the one or more opaque polymers or polymer materials (i.e., spherical polymer particles, non-spherical polymer particles, irregular and/or odd-shaped polymer particles, or a mixture thereof) are sensitive to application of predetermined light/laser energy, heat, pressure and/or chemical change such that exposure to at least one light/laser energy (i.e., predetermined amount, frequency and/or intensity), heated to a predetermined temperature, subjected to a predetermined pressure, and/or chemically changed, at least one opacifying layer or both opacifying layers may become transparent and/or clear. As a result of becoming transparent and/or clear, the at least one opacifying layer transmits or both opacifying layers transmit incident light to reveal the color material(s) (e.g., ink(s)) and/or the color layer(s) disposed on the first side surfaces underneath the opacifying layer(s) and the one or more opaque polymers or polymer materials.

In one or more embodiments, a multi-layered revealable substrate comprises a first layer of a first opacifying material, a first color material disposed on a first side of the first layer of the first opacifying material, wherein the first layer of the first opacifying material covers the first color material, and a second layer of a second opacifying material disposed on a side of the first color material that is located opposite with respect to the first layer of the first opacifying material, wherein the first opacifying material is configured to, upon application of first predetermined energy, change from the opaque state to a transparent state to reveal the first color material underneath the first opacifying material, the second opacifying material is configured to, upon application of second predetermined energy, change from the opaque state to a transparent state, and the first predetermined energy is a different predetermined energy than the second predetermined energy.

In at least one embodiment, at least one of the first predetermined energy and the second predetermined energy is predetermined light and/or laser energy.

In some embodiments, both energies of the first predetermined and second predetermined energies are predetermined light and/or laser energies.

In an embodiment, the second predetermined energy is greater than the first predetermined energy.

In at least one embodiment, the revealable substrate further comprises a second color material disposed on a first side of the second layer of the second opacifying material, wherein the second layer of the second opacifying material covers the second color material, wherein the second opacifying material transitions from the opaque state to a transparent state upon application of the second predetermined energy to reveal the second color material thereunder.

In some embodiments, the second predetermined energy is greater than the first predetermined energy.

In an embodiment, the first and second predetermined energies consist of light and/or laser energies.

In at least one embodiment, the revealable substrate further comprises a base substrate backing to which the second color material is coupled, wherein the first and second color materials are disposed between the base substrate and the first layer of the first opacifying material.

In one or more embodiments, a method comprises providing a first color material covered with a first layer of a first opacifying material in an opaque state such that the first opacifying material impedes visibility of the first color material through the first opacifying material, disposing a second layer of a second opacifying material onto a side of the first color material that is located opposite with respect to the first layer of a first opacifying material, changing at least a portion of the first layer of the first opacifying material from an opaque state to a transparent state via application of a first predetermined energy to reveal the first color material underneath the first opacifying material, and changing at least a portion of the second layer of the second opacifying material from an opaque state to a transparent state via application of a second predetermined energy, wherein the first predetermined energy is about less than the second predetermined energy.

In at least one embodiment, the method further comprises covering a side of a second color material with the second layer of the second opacifying material such that, upon application of the second predetermined energy onto at least the portion of the second layer of the second opacifying material, the second color material thereunder is revealed and visible from a side of the first layer of the first opacifying material that is opposite with respect to the first color material.

In some embodiments, the method further comprises modifying a revealed portion of the first color material with a revealed portion of the second color material to produce and reveal a modified color.

In an embodiment, the modified color comprises a combination of a first color of the first color material and a second color of the second color material.

In at least one embodiment, the revealed first color material is or comprises at least one machine-readable code displayed in a single color or a mixture or plurality of colors.

In some embodiments, the at least one machine-readable code is displayed in the single color and is at least one selected from a machine-readable bar code, a machine-readable QR code, and a combination thereof.

In an embodiment, the at least one machine-readable code is displayed in the mixture or plurality of colors and is at least one selected from a machine-readable bar code, a machine-readable QR code, and a combination thereof.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
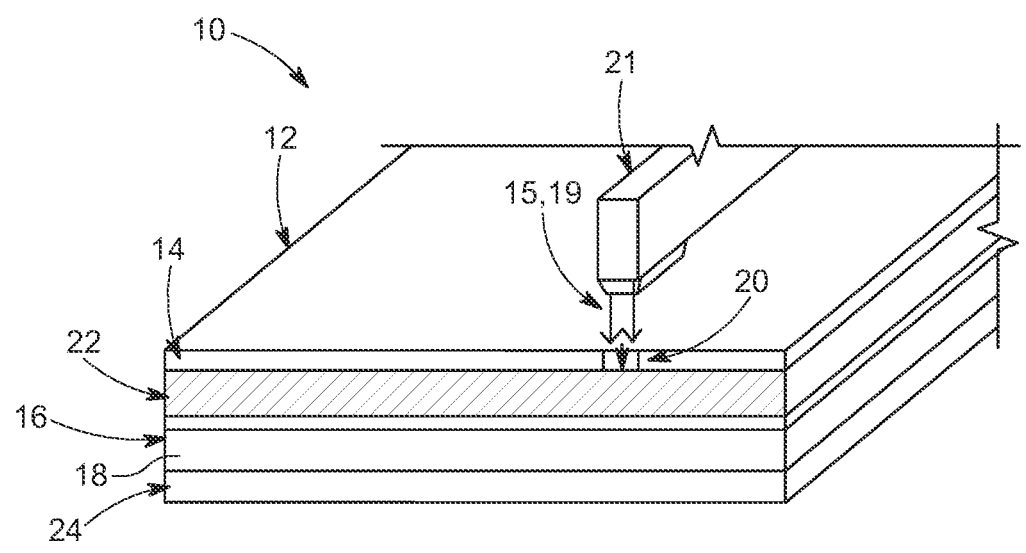
FIG. 1 is a perspective view of a multi-layered revealable substrate in accordance with one or more examples of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Referring now to the drawings wherein like numerals refer to like parts/features, a multi-layered revealable substrate is generally referred to by the numeral 10 as shown in FIGS. 1-4 and is at least one of a thermal-reveal substrate, a light/laser energy-reveal substrate, a chemical-reveal substrate, a pressure-reveal substrate, or a combination thereof. The multi-layered revealable substrate 10 is a thermal, a light/laser energy, a chemical, and/or a pressure reveal substrate (collectively referred to herein after as "substrate 10") which includes a first light/laser energy, thermally, pressure and/or chemically sensitive substrate 12 (hereinafter "first sensitive substrate 12") having a first opacifying material or layer 14 (hereinafter "first opacifying material 14") which may be induced to become transparent, semi-transparent, translucent, semi-translucent, colored-transparent, and/or colored-translucent, (i.e., transition from an opaque state to a transparent state, a semi-transparent state, a translucent state, a semi-translucent state, a colored-transparent state, a colored-translucent state, or a combination thereof (collectively referred to hereinafter as "the transparent state")). Further, the substrate 10 includes a second light/laser energy, thermally, pressure and/or chemically sensitive substrate 16 (hereinafter "second sensitive substrate 16") having a second opacifying material or layer 18 (hereinafter "second opacifying material 18") which may be induced to become transparent, semi-transparent, translucent, semi-translucent, colored-transparent, and/or colored translucent (i.e., transition from an opaque state to the transparent state). In some embodiments, the first opacifying material 14 may be a different opacifying material than the second opacifying material 18 such that the first opacifying material 14 and/or the second opacifying material 18 (collectively referred to hereinafter as "first and second opacifying materials, 14, 18") have different transitional parameters and/or energies for transitioning from the opaque state to the transparent state. In more than one embodiment, application of a first predetermined energy 15 (i.e., predetermined light/laser energy, heat, pressure, chemical, or combination thereof; hereinafter "first energy 15") to the first opacifying material 14 may transition the first opacifying material 14 from the opaque state to the transparent state, but application of the first energy 15 to the second opacifying material 18 may or may not transition the second opacifying material 18 from the opaque state to the transparent state. However, application of a second predetermined energy 19 (i.e., predetermined light/laser energy, heat, pressure, chemical or combination thereof; hereinafter "second energy 19"), which is greater in at least one of amount, frequency, and intensity than the first energy 15, may transition both the first and second opacifying materials 14, 18 from opaque states to transparent states. In an embodiment, the first opacifying material 14 may be the same, substantially the same, similar, or substantially similar to the opaque and/or opacifying material of the second opacifying material 18 such that both the first and second opacifying materials 14, 18 may transition from the opaque states to the transparent states upon application of the first energy 15 and/or the second energy 19.

In one or more embodiments, the first and second opacifying material 14, 18 may be induced to become transparent by being exposed to the first energy 15 and/or the second energy 19 (collectively referred to hereinafter as "first and second energies 15, 19"). In embodiments, the first and second energies 15, 19 may be, comprise of, or consist of at least one predetermined light energy and/or laser energy (hereinafter "light/laser energy"), heated at or to at least one predetermined high temperature, subjected to at least one predetermined pressure, and/or chemically reacted or changed to cause the transition(s) from the opaque state(s) to the transparent state(s). As a result, the first and second opacifying materials 14, 18 may become or transition to be transparent and/or clear to reveal color material(s) (i.e., ink(s)) and/or one or more colored layers thereunder as depicted in at least one reveal region 20 (hereinafter "region 20") as shown in FIGS. 1-4. In at least one embodiment, the color material(s), the ink(s), and/or the one or more colored layers may be, may comprise, or may consist of one or more opaque inks, one or more transparent and/or transparent inks, one or more colored opaque inks, one or more colored transparent and/or transparent inks, or at least one combination thereof.

In one or more embodiments, the first and second opacifying materials 14, 18 may each comprise at least one opaque polymer or polymer material which may comprise a plurality of spherical polymer particles, a plurality of non-spherical polymer particles, a plurality of irregular and/or odd-shaped polymer particles, or a mixture thereof (collectively referred to hereinafter as "polymer particles"). In some embodiments, the at least one opaque polymer or polymer material may have a melting point of at least about 37° C., about 37-150° C., about 80-150° C. or greater than about 150° C. In an embodiment, the at least one opaque polymer or polymer material may comprise more than one polymer or a copolymer, such as, for example, styrene acrylic-copolymer. In another embodiment, the opaque polymer may comprise a hollow sphere pigment which may appear opaque as a result of its light scattering properties. In other embodiments, the at least one opaque polymer may have a physical and/or chemical structure that may be altered and/or changed by application of heat, pressure, light/laser energy (i.e., the first and second energies 15, 19), and/or chemical exposure such that the at least one opaque polymer or polymer material becomes transparent or at least substantially transparent. In one or more other embodiments or alternative embodiments, the at least one opaque polymer or polymer material may be in accordance, or substantially in accordance, with one or more opaque polymers set forth in U.S. Pat. App. Pub. No. US 2017/0337851, incorporated herein by reference, in its entirety.

In some embodiments, the at least one opaque polymer or polymer material the first and second opacifying materials 14, 18 may comprise hollow polymer microspheres that appear white until broken by the first and second energies 15, 19. Thus, the at least one opaque polymer or polymer material only shows opaque color, which can be white, for example. It is only upon application of the first and second energies 15, 19 that the hollow polymer microspheres transition from an opaque state to the transparent state. In at least one embodiment, the at least one opaque polymer or polymer material may be hollow microspheres made of a styrene acrylic-copolymer which appear to eye of viewer as white or opaque when applied over a surface, and regardless of whether applied to a color or a clear surface, renders the viewed surface white. Upon applying the first and second energies 15, 19, the hollow microspheres are rendered non-opaque and the region to which the first and second energies are applied enables transparency thus revealing the color material(s) (i.e., ink(s)) thereunder. In other embodiments, the at least one opaque polymer or polymer material may comprise opaque polymer including styrene-acrylic copolymer (or equivalent) which in a preferred form can be a generally microspherical form that provides a opacifying polymer material and renders a white appearance by virtue of reflective properties in the opaque polymer.

An opacity of the first and second opacifying materials 14, 18 and/or the one or more opaque polymers or polymer materials of the first and second opacifying materials 14, 18 may depend upon spacings and/or voids disposed therebetween and/or outside the polymer particles. The spacings and/or voids may be disposed between the outer perimeters and/or exterior surfaces of the polymer particles, and/or the spacings and/or voids may not be disposed inside or within perimeters and/or exterior surfaces of the polymer particles. In other words, the spacings and/or voids are disposed exterior with respect to the polymer particles. The polymer particles may be non-spherical and/or may have different shapes and/or different sizes. The first and second opacifying materials 14, 18 and/or the one or more opaque polymers or polymer materials of the first and second opacifying materials 14, 18 may be induced to become transparent by being exposed to the first and second energies 15, 19 (i.e., different light/laser energies, heated at different high temperatures, subjected to different pressures, and/or chemically reacted or changed differently with respect to each other). As a result, the polymer particles of the one or more opaque polymers or polymer materials may melt and/or change shapes such that the spacing and/or voids between the exterior surfaces of the polymer particles are removed or lost and the first and second opacifying materials 14, 18 may become transparent and/or clear to reveal the color material(s) (i.e., ink(s)) and/or the one or more color layers thereunder.

In more than one embodiment, the polymer particles of the first and second opacifying materials 14, 18 or the one or more opaque polymers or polymer materials comprise at least one first portion of polymer particles and at least one second portion of polymer particles that each have different sizes and/or different shapes. The at least one first portion of polymer particles may have first sizes and/or first shapes, and the at least one second portion of polymer particles may have second sizes and/or second shapes. In some configurations, the first sizes are similar to the second sizes and the first shapes are different than the second shapes; the first sizes are different than the second sizes and the first shapes are similar to the second shapes; or the first sizes are different than the second sizes and the first shapes are different than the second shapes. The spacings and/or voids between the polymer particles of the at least one first portion may be the same as, different than, or substantially similar to the spacing and/or voids between the polymer particles of the at least one second portion. In some embodiments, a ratio of the respective surface areas and/or masses of the first portion(s) to the second portion(s) may be about 1:1, greater than about 1:1, or less than about 1:1. For example, the ratio of the respective surfaces areas or masses of the first portion(s) to the second portion(s) may be from about 1:1 to about 10:1; from about 3:1 to about 8:1, or from about 4:1 to about 6:1.

In some embodiments, the polymer particles of the first and second opacifying materials 14, 18 or the one or more opaque polymers or polymer materials of the first and second opacifying materials 14, 18 may provide dual purposes for both improved laser and/or inkjet imaging and printing processes and/or methods. In at least one embodiment, the polymer particles may provide an improved light/laser and/or thermal imaging quality or sharpness and an improved laser and/or inkjet receptiveness. Moreover, the improved imaging quality provided by the polymer particles is advantageous over traditional thermal printing mechanisms. The polymer particles of the first and second opacifying materials 14, 18 are advantageous because no leuco dyes, no sensitizer, and/or no color developers are required or necessary which makes the first and second opacifying materials 14, 18 of the present disclosure compliant and/or in accordance with increased health and/or environmental laws and regulations. For example, embodiments of the first and second opacifying materials 14, 18 may be completely free of, or at least substantially free of, leuco dyes, sensitizers, and/or color developers.

In at least one embodiment, average particle sizes of the polymer particles disclosed herein may be at least about 50 nm, at least about 100 nm, at least about 150 nm, at least about 250 nm, no more than about 1,000 nm, no more than about 500 nm, no more than about 450 nm, no more than about 400 nm, or no more than about 350 nm. In another embodiment, the average particle sizes of the present polymer particles may have average particle sizes of up to about 1,000 nm or up to about 1,500 nm. In one or more embodiments, the present polymer particles may have average particle sizes between and/or including about 1,000 nm and about 1,500 nm.

In embodiments, the polymer particles of the first and second opacifying materials 14, 18 or the one or more opaque polymers or polymer materials may provide high or improved opacity, good or improved resolubility, and/or good or improved water and rub resistance to the substrate 10 (e.g., relative to spherical particles). The spacings and/or voids between the polymer particles may receive ink, printing color(s), and/or printed indicia for inkjet color printing of the substrate 10. At least one or more parts or portions of the layers of the first and second opacifying materials 14, 18 may be rendered transparent to reveal color material(s) (e.g., ink(s)) or one or more colored layers underneath the polymer particles, e.g., for direct light/laser and/or thermal printing of the substrate 10. In some embodiments, one or more of the polymer particles may be aligned such that, when in the transparent state or condition, the transparency clearly reveals the color material(s) (i.e., ink(s)) and/or one or more color layer(s) underneath the first and second opacifying materials 14, 18. As a result, light/laser and/or thermal imaging of the substrate 10 may achieve improved image density and/or improved sharpness for light/laser and/or thermal printing or imaging of the substrate 10.

In some embodiments, the first sensitive substrate 12 and/or the second sensitive substrate 16 (collectively referred to hereinafter as "first and second sensitive substrates 12, 16") may include one or more opacifiers such as titanium dioxide in a particulate form as an opacifier and/or white pigment. Particulate titanium dioxide for use as an opacifier in a polymer composition and products formed therefrom is widely available and may include titanium oxide, calcium carbonate, zinc white, white lead, lithopone, alumina white, white carbon, zirconium oxide, tin oxide, barium sulfate, barium carbonate, or a combination thereof.

The polymer particles of the first and second opacifying materials 14, 18 or the one or more opaque polymers or polymer materials of the first and second opacifying materials 14, 18 may have a heat melting and/or transition property or a suitable glass transition state (hereinafter "Tg") which defines a pseudo second order phase transition in which a supercooled melt yields, on cooling, a glassy structure and properties similar to those of crystalline materials, e.g., of an isotropic solid material. The Tg may be applicable to wholly or partially amorphous solids such as common glasses and plastics (i.e., the polymer particles). The heat melting temperature and/or Tg of the polymer particles of the first and second opacifying materials 14, 18 may be less than about 120° C., less than about 110° C., less than about 105° C., less than about 95° C., and less than about 85° C. In some embodiments, the heat melting temperature and/or Tg of the polymer particles may be in the range from about 80° C. to about 130° C., 90° C. to about 120° C., from about 100° C. to about 110° C., or from about 100° C. to about 105° C. In other embodiments, the heat melting temperature and/or Tg of the polymer particles may be greater than about 70° C., greater than about 80° C., greater than about 95° C., or greater than about 100° C.

In embodiments, the polymer particles of the first and second opacifying materials 14, 18 or the one or more opaque polymers or polymer materials of the first and second opacifying materials 14, 18 may comprise at least one of styrene and acrylate and/or may be provided in a suspension and/or with a carrier. The suspension may be in the form of a water-based emulsion. In embodiments, the water-based emulsion may be an acrylic emulsion or a styrene acrylic emulsion. The water-based emulsion may be a non-film forming emulsion or a film-forming emulsion. The water-based emulsion may have a pH at 25° C. of less than about 8.5, less than about 8.0, less than about 7.5, greater than about 6.5, greater than about 7.0, or about 7.5. The water-based emulsion may have a viscosity at 25° C. of less than about 100 cps, at least about 200 cps, at least about 300 cps, at least about 400 cps, no more than about 2200 cps, no more than about 2100 cps, or no more than about 2000 cps. The water-based emulsion may have a molecular weight (hereinafter "Mw") of greater than about 150,000, greater than about 175,000, greater than about 200,000, less than about 250,000, less than about 230,000, or less than about 210,000. The water-based emulsion may have a density at 25° C. of less than about 1.12 g/cm$^3$, less than about 1.10 g/cm$^3$, less than about 1.06 g/cm$^3$, greater than about 1.02 g/cm$^3$, greater than about 1.04 g/cm$^3$, or greater than about 1.06 g/cm$^3$.

In addition to the polymer particles or one or more opaque polymers or polymer materials, the first and second opacifying materials 14, 18 may further comprises at least one wax, at least one optional sensitizer, at least one optical brightener, at least one binder or resin, and/or at least one optional additive. In embodiments, the at least one optional additive may comprise one or more components selected from the group of components consisting of: clays, defoamers, surfactants, biocides, viscosity modifiers, and/or rheology modifiers. In other embodiments, the at least one optional additive may comprise at least one component selected from the group of components consisting of: emulsifiers, surfactants, lubricants, coalescing agents, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, water-repellants, anti-oxidants, and one or more combinations thereof.

In embodiments, the polymer particles or the one or more opaque polymers or polymer materials may be present in the first and second opacifying materials 14, 18 at a concentration of at least about 5% by weight, at least about 10% by weight, at least about 20% by weight, at least about 25% by weight, at least about 40% by weight, at least about 50% by weight, or greater than about 50% by weight. In other embodiments, polymer particles or the one or more opaque polymers or polymer materials may be present in the first and second opacifying materials 14, 18 at a concentration of less than about 55% by weight, less than about 45% by weight, less than about 30% by weight, less than about 20% by weight, less than about 15% by weight, or less than about 8% by weight. All concentrations by weight are calculated relative to a total weight of the first and second opacifying materials 14, 18.

The at least one wax may be provided in a suspension and/or with at least one carrier. In embodiments, the at least one wax may be at least one selected from a paraffin wax, a microcrystalline wax, a carnauba wax, a methylol stearo-amide, a polyethylene wax, a polystyrene wax, a fatty acid amide-based wax, or a combination thereof. In other embodiments, the one wax may comprise at least one selected from erucamide, stearic acid amide, palmitic acid amide, ethylene-bis-stearic acid amide, or a combination thereof.

The at least one optional sensitizer may be configured to lower a melting and/or Tg temperature of polymer particles. For example, the at least one optional sensitizer may be selected from 2-benzyloxynaphthalene, dimethylbenzyl oxalate, m-terphenyl, ethylene glycol tolyl ether, p-benzyl biphenyl, 1,2-diphenoxy methyl benzene, 1,2-diphenoxy-ethane, diphenylsulfone, aliphatic monoamide, aliphatic bis-amide, stearyl urea, di(2-methylphenoxy)ethane, di(2-methoxyphenoxy)ethane, .beta.-naphthol-(p-methylbenzyl) ether, .alpha.-naphthyl benzyl ether, 1,4-butanediol-p-methyl phenyl ether, 1,4-butanediol-p-isopropyl phenyl ether, 1,4-butanediol-p-tert-octyl phenyl ether, 1-phenoxy-2-(4-ethylphenoxy)ethane, 1-phenoxy-2-(chlorophenoxy) ethane, 1,4-butanediol phenyl ether, diethylene glycol bis (4-methoxyphenyl)ether, and 1,4-bis(phenoxymethyl) benzene. These optional sensitizers may be used alone or in a combination of two or more thereof. In embodiments, the first and second opacifying materials 14, 18 may be formulated, adapted, and/or configured such that inclusion of the optional sensitizer is reduced or eliminated. For example, some embodiments of the first and second opacifying materials 14, 18 may be completely free, or at least substantially free, of the optional sensitizer.

The at least one optical brightener may comprise one or more optical brightening agents, one or more fluorescent brightening agents, one or more fluorescent whitening agents, or a combination thereof. In embodiment, the at least one optical brightener may absorb light in the ultraviolet and violet region of the electromagnetic spectrum and/or may re-emit light in the blue region by fluorescence. For example, the at least one optical brightener may comprise one or more stilbenes.

The at least one binder or resin may comprise one or more thermoplastic and/or crosslinkable resins. In embodiments, the at least one binder or resin may be one or more selected from polyvinyl alcohol, protein, such as, for example, casein, starch, gelatin, copolymers of acrylic acid esters or methacrylic acid esters, copolymers of styrene and acrylic or methacrylic acid esters, copolymers of styrene and acrylic acid, styrene-butadiene copolymers, copolymers of vinyl acetate with other acrylic or methacrylic acid esters, and one or more combinations thereof.

In one or more embodiments, the first and second opacifying materials 14, 18 comprising the polymer particles or the one or more opaque polymers or polymer materials disclosed herein may be disposed on and/or utilized with the substrate 10 and/or in the present method also disclosed herein. The substrate 10 may have a structural configuration and/or relationships such that the first sensitive substrate 12, comprising the first opacifying material 14, is disposed at a top side or an uppermost layer of the substrate 10 as shown in FIGS. 1-4. A first colored substrate or layer 22 (hereinafter "first colored layer 22") may be disposed beneath the first sensitive substrate 12, and the second sensitive substrate 16, comprising the second opacifying material 18, may be disposed beneath the first colored layer 22 such that the first colored layer 22 may be disposed between the first and second sensitive layers 12, 16 and the first and second opacifying materials 14, 18. A second colored substrate or layer 24 (hereinafter "second colored layer 24") may be disposed beneath the second sensitive substrate 16 such that the second sensitive substrate 16 is disposed between the first colored layer 22 and the second colored layer 24 (collectively referred to hereinafter as "first and second colored layers 22, 24"). A base substrate 26 (hereinafter "base 26") may be disposed beneath the second colored layer 24 such that the second colored layer 24 is disposed between the second sensitive substrate 16 and the base 26. In some embodiments, the base 26 may be, comprise of, or consist of a paper-based substrate, a film-based substrate, a polymer-based substrate, a release film substrate, an adhesive-based layer or substrate, or a combination thereof.

In at least one embodiment, a first side surface of the first sensitive substrate 12 adjacent to the second sensitive substrate 16 may include or be coated with the first colored layer 22 which may comprise at least one colored ink, covering at least a portion, or substantially the entire, of the first side surface of the first sensitive substrate 12. In one or more embodiments, the at least one colored ink disclosed herein may be, may comprise, or may consist of one or more opaque inks, one or more translucent and/or transparent inks, one or more colored opaque inks, one or more colored translucent and/or transparent inks, or at least one combination thereof. The first colored layer 22 may have at least one first colored area 28 (hereinafter "first colored area 28") comprising one or more inks that may be of any desired color or colors. In an embodiment, the first colored area 28 of the first colored layer 22 may be of or may comprise any desired color or colors. In one or more embodiments, the first colored area 28 may be, may comprise, or may consist of one or more opaque inks, one or more translucent and/or transparent inks, one or more colored opaque inks, one or more colored translucent and/or transparent inks, or at least one combination thereof. By virtue of the first sensitive substrate 12 having the first opacifying material 14, when viewed from a second side surface, opposite with respect to the first colored layer 22, prior to any light/laser energy, thermal, and/or pressure application, such as by a light/laser, thermal and/or pressing print head 21 (hereinafter "print head 21"), the first colored area 28 is not viewable. In an embodiment, the first opacifying material 14 may be part of a physical composition of the first sensitive substrate 12 or may be a separate and/or independent layer or layers. In embodiments, this may be accomplished by providing the polymer particles or the one or more opaque polymers or polymer materials of the first and second opacifying materials 14, 18 disclosed herein which may appear white or opaque until application of at least one of light/laser energy, heat, pressure, or a combination thereof (i.e., application of the first energy 15). Thus, the second side surface of the first sensitive substrate 12 may only show opaque color, which may be, for example, white or at least one different opaque color. It is only upon application of light/laser energy, high temperature heat and/or pressure (i.e., application of the first energy 15) that the black, gray, and/or one or more other colors of the first colored area 28, on the first side surface of the first sensitive substrate 12, is revealed or viewable.

In at least one embodiment, a first side surface of the second sensitive substrate 16 adjacent to the base 26 may include or be coated with the second colored layer 24 which may comprise at least one colored ink, covering at least a portion, or substantially the entire, of the first side surface of the second sensitive substrate 16. The second colored layer 24 may have at least one second colored area 30 (hereinafter "second colored area 30") comprising one or more inks that may be of any desired color or colors. In an embodiment, the second colored area 30 of the second colored layer 24 may be of or may comprise any desired color or colors. In one or more embodiments, the second colored area 30 disclosed herein may be, may comprise, or may consist of one or more opaque inks, one or more translucent and/or transparent inks, one or more colored opaque inks, one or more colored translucent and/or transparent inks, or at least one combination thereof. By virtue of the first and second sensitive substrates 12, 16 having the first and second opacifying materials 14, 18, respectively, when viewed from second side surfaces of the first and second sensitive substrates 12, 16, opposite with respect to the base 26, prior to any light/laser energy, thermal, and/or pressure application by the print head 21, the first colored area 28 and second colored area 30 (collectively referred to hereinafter "first and second colored areas 28, 30") are not viewable. In an embodiment, the second opacifying material 18 may be part of a physical composition of the second sensitive substrate 16 or may be a separate and/or independent layer or layers. In some embodiments, this may be accomplished by providing the polymer particles disposed within the first and second sensitive substrates 12, 16 that may appear white or opaque until application of at least one of light/laser energy, heat, pressure, or a combination thereof (i.e., application of both first and second energies 15, 19). Thus, the second side surfaces of the first and second sensitive substrates 12, 16 may only show opaque color, which may be, for example, white or at least one different opaque color. It is only upon application of light/laser energy, high temperature heat and/or pressure (i.e., application of both first and second energies 15, 19) that the blacks, grays, and/or one or more other colors of the first and second colored areas 28, 30, on the first side surfaces of the first and second sensitive substrates 12, 16, are revealed or viewable. In one or more configurations disclosed herein, the first side surfaces of the first and second sensitive substrates 12, 16 are adjacent the base 26, and the second side surfaces of the first and second substrates 12, 16 are adjacent to the top side of the substrate 10.

In one or more embodiments, the first and second opacifying materials 14, 18 comprising the polymer particles or the one or more opaque polymers or polymer materials which appears to eye of viewer as white or another opaque color when applied over a surface, and regardless of whether applied to a color or a clear surface (i.e., the first and second colored layers 22, 24), renders the viewed surface (first side surfaces of the first and second sensitive substrates 12, 16) white or at least one different opaque color. Upon applying predetermined light/laser energy, predetermined pressure and/or predetermined heat via the print head 21 (i.e., at least one of or both of the first and second energies 15, 19), the polymer particles or the one or more opaque polymers or polymer materials are rendered non-opaque and the region 20 to which such print head 21 is applied enables transparency thus revealing the first colored area 28 (i.e. upon application of the first energy 15) or the first and second colored areas 28, 30 (i.e., upon application of the second energy 19) thereunder.

In some embodiments, each colored area of the first and second colored areas 28, 30 may comprise a single color or at least two different colors as shown in FIGS. 1-4. In at least one embodiment, at least one colored area of the first and second colored areas 28, 30 may comprise at two different colored areas, at least to different colors, and/or at least one two-dimensional matrix as described and disclosed within the '440 patent and throughout U.S. Pat. No. 9,757,968, incorporated herein by reference, in its entirety. In at least one embodiment, each of the colored areas of the first and second colored areas 28, 30 may be formed by a plurality of color blocks comprising at least one first color block 32a, at least one second color block 32b, and at least one third color block 32c (hereinafter "color blocks 32a, 32b, 32c"). Each color block of the color blocks 32a, 32b, 32c may have or display only one color of at least two different colors, and/or the color blocks 32a, 32b, 32c may be arranged within the first and second colored layers 22, 24 to have at least one repeating color pattern, design and/or indicia. In an embodiment, at least two color blocks of the color blocks 32a, 32b, 32c may have or display a single color. In other embodiments, the one or more of the color blocks 32a, 32b, 32c disclosed herein may be, may comprise, or may consist of one or more opaque inks, one or more translucent and/or transparent inks, one or more colored opaque inks, one or more colored translucent and/or transparent inks, or at least one combination thereof.

In one or more embodiments, the color blocks 32a, 32b, 32c of the first and second colored areas 28, 30 may have or comprise at least two colors of the CMYK color model, which is often used for printed color illustrations. The CMYK color model is a subtractive color model which uses the colors cyan, magenta, yellow, and/or key (black) and may comprise one or more overlapping areas of at least two of the colors cyan, magenta, yellow and/or key (black). The CMYK color model is known to those having ordinary skill in the art, and discussed in detail in, e.g., Tkalcic et al. "Colour spaces, perceptual, historical and applicational background", University of Ljubljana, EUROCON 2003, pps 304-308; and Jennings, S. Artist's Color Manual: The Complete Guide to Working with Color. Chronicle Books LLC. (2003). When each color block 32a, 32b, 32c comprise each of the four colors of the CMYK color model, each color block 32a, 32b, 32c is divided or partitioned into fourths wherein each color of the four colors is provided at or within one-fourth of each color block 32a, 32b, 32c.

In some embodiments disclosed herein, the color blocks 32a, 32b, 32c of the first and second colored areas 28, 30 may comprise three colors of the CMYK color model. In at least one embodiment, each color block of the color blocks 32a, 32b, 32c may be, may comprise, or may consist of cyan, magenta, and yellow. As a result of comprising three colors of the CMYK color model, each color block 32a, 32b, 32c may be divided or partitioned into thirds wherein each color of the three colors may be provided at or within one-third of each color blocks 32a, 32b, 32c. Thus, utilizing only three colors of the CMYK color model instead of all four colors may achieve improved color brightness, intensity and/or alignment because of the increased surface area (i.e., 33% for each of the three colors verses 25% for each of the four colors) for each of the three colors of the CMYK color model. In one or more embodiments, the first sensitive substrate 12 may be or may comprise a first single color, such as, for example, white, the color blocks 32a, 32b, 32c may each comprise three colors of the CMYK color model, and the second sensitive substrate 16 or the base 26 may comprise a second single color, such as, for example, black or gray.

In at least one preferred embodiment, the first colored layer 22 of the substrate 10 may be, may comprise, or may consist of three colors of the CMYK color model, and the second colored layer 24 may comprise of a single color, such as, for example, black, gray, or a combination thereof. In at least one embodiment, the first and second sensitive substrates 12, 16 may be, may comprise, or may consist of a single color, such as, for example, white or another single color. In an embodiment, the three colors of the CMYK color model is, comprises, or consists of cyan, magenta, and yellow.

In alternative embodiments, the color blocks 32a, 32b, 32c of the first and second colored areas 28, 30 may have or comprise at least two colors of the RGB color model, which is also usable for printing color illustrations. The RGB color model utilizes additive color mixing with primary colors of red, green, and blue. In yet another alternative embodiment, the color blocks 32a, 32b, 32c may have or comprise one or more colors of at least one known color system, such as, for example, the American Munsell color system, the Swedish Natural Color System, the Optical Society of America's Uniform Color Space, the Hungarian Coloroid system and the American Pantone and the German RAL commercial color-matching system. In the alternative embodiments, it should be understood that the present disclosure is not deemed limited to a specific embodiment of the color model and/or color system provided at or by the color blocks 32a, 32b, 32c and/or the first and second colored areas 28, 30.

In some embodiments, one or more of the arrangements of colors provided on the first and second colored layers 22, 24 may be in the form of or configured as at least one grid. The portions and/or squares of the at least one grid, which form a two-dimensional matrix, may be lined up with respect to each other or the portions and/or squares may be off-set with respect to each other. It should be clear to a person skilled the art that borders of the color blocks 32a, 32b, 32c may not be physically and visibly present on top surfaces of the first and second colored layers 22, 24. Moreover, the color blocks 32a, 32b, 32c may be present such that one or more overlapping areas on the grid or the matrix are formed or provided wherein at least two different colors may overlap each other forming an additional or different color thereon.

In at least one embodiment, an adhesive material (not shown in the drawings), such as pressure sensitive adhesive, may be applied to a side surface of the second colored layer 24 or the base 26 that is located opposite with respect to the second sensitive substrate 16. In an embodiment, the adhesive material may permit the substrate 10 to be adhered to another surface, such as a product package, and a release substrate (not shown in the drawings) may be applied to the adhesive material. Optionally in lieu of release substrate, a paper-based substrate (not shown in the drawings) may be applied to the adhesive material thereby forming a composite thermal and/or pressure sensitive reveal substrate for the substrate 10. The paper-based substrate may be mated to the second sensitive substrate 16 or the base 26 as part thereof. PSA or other adhesive material may be employed to perform connection between the release substrate or paper substrate and the second sensitive substrate 16 or the base 26. In an embodiment, the paper-based substrate may include a color paper, a film, or a board, or a combination thereof.

The first and second sensitive substrates 12, 16 may also comprise the polymer particles or the one or more opaque polymers or polymer materials disclosed herein to render a further white appearance by virtue of light scattering properties in the polymer particles and/or provided by the first and second opacifying materials 14, 18. The first and second sensitive substrates 12, 16 may have a heat melting or Tg in the range from about 80° C. to about 120° C. for one or more printing methods and/or applications disclosed herein. For example, in certain embodiments, the polymer particles or the one or more opaque polymers or polymer materials have a melting temperature or glass transition temperature of from about 80° C. to 120° C., from 90° C. to 110° C., or from 95° C. to 105° C.

Additionally, the first sensitive substrate 12 may include another coating (not shown in the drawings) such as varnish as a protective element (a so-called over print lacquer) to protect the first opacifying material 14. Said coating may be of a polymer material, such as, for example, a modified styrene acrylic polymer which may be essentially transparent or clear and have a higher melt point than polymer particles of the first opacifying material 14 to serve as a protective barrier for the underlying first opacifying material 14 against normal user handling and exposure to elements of sun and heat, but permit lighting, lasering, melting and/or pressurizing of the polymer particles of the first and second opacifying materials 14, 18 to effect imaging and/or printing as explained herein.

The print head 21 may be utilized to apply light/laser energy (i.e., at least one or both of the first and second energies 15, 19) or perform melting or pressure to transition the polymer particles of the first and second opacifying materials 14, 18 from opaque to translucent and may do so in selected portions of the first and second sensitive substrates 12, 16. The print head 21 may be equipped to provide a sufficient or predetermined light/laser energy, temperature, and/or pressure to effect lighting/laser, melting, and/or pressure transition of the first and second sensitive substrates 12, 16. Some applications may find it more suitable to provide the first and second sensitive substrates 12, 16 with at least one lower transition state by employing at least one low crosslinking technology. By properly selecting the polymer particles or the one or more opaque polymers or polymer materials, the melting point may be less than about 110° C., less than about 105° C., less than about 100° C., less than about 90° C., or less than about 80° C. The grade of polymer particles or one or more opaque polymers or polymer materials may have chemical resistance which does not melt at room temperature.

In some embodiments, the first and second sensitive substrates 12, 16 may comprise a material appearing white and having an appropriate melting point for safe application use with the print head 21. Thus, the substrate 10, when viewed from the top side, may appears white or of light color which precludes viewing the first and second colored areas 28, 30, the color blocks 32a, 32b, 32c, and/or the base 26. Upon heating to affect a transition state of the polymer particles or the one or more opaque polymers or polymer materials of the first and second opacifying materials 14, 18, the glass-like appearance is achieved and the opacifying material is tailored in an amount to reveal the first and second colored areas 28, 30, the color blocks 32a, 32b, 32c, and/or the base 26 in a usable manner.

Unlike other prior art thermal activated paper, the present polymer particles or the one or more opaque polymers or polymer materials may be less sensitive to subsequent exposure of UV rays, luminescent lamps, perspiration of hands and fingers and slight rubbing or other solvents. By way of contrast the substrate 10 disclosed herein is an excellent substrate that may solve one or more of the above-mentioned various difficulties. The color revealed image(s) displayable via the substrate 10 may be any of one or more various colors, such as, for example, black, red, dark purple, blue, and/or the like. While it is conceived that traditional color-developing reaction materials can be employed in the present disclosure, the substrate 10 disclosed herein provides a more secure, simpler, and less expensive product. In some embodiments, the product provided, produced, and/or manufactured by or from the substrate 10 may be a direct light/laser and/or thermal imaging product and/or a pressure sensitive product. For example, the substrate 10 may be a pressure sensitive label, tag, ticket, a point-of-sale document, or receipt, or one or more combinations thereof. In other embodiments, the substrate 10 may be or comprise one or more thin layers, one or more films, or a combination thereof.

In addition to the product formed being more stable in typical ambient temperatures, the substrate 10 disclosed herein may also provide for a quick and easy means for destroying sensitive information printed thereon, such as in the case of HIPAA labels. In this regard, the labels can simply be passed through a laser print head and/or a heated plate or pressure roller nips and the sensitive information will be rendered unreadable. In the case of forming labels, an adhesive material may, for example, be applied either directly over the second colored layer 30 or the adhesive may be applied to a back side of the base 26.

The substrate 10 disclosed herein may exhibit and/or have easy handling properties and a good appearance and touch. According to further features of the substrate 10, the first and second sensitive substrates 12, 16 suppresses aging and provides high stability for a long period as well as for enhancing contrast of thermally revealed images to solve the difficulty in reading such images.

Therefore, even when a highly transparent substrate such as a completely transparent film of polyethylene is used, the product after coating has a white appearance to distinctly contrast the heat revealed image. An amount of the first and second opacifying materials 14, 18 should be such as to permit translucent effect to be achieved upon heating or pressure yet mask the first and second colored areas 28, 30 and/or the color blocks 32a, 32b, 32c prior thereto with the laser and/or thermal and/or pressure print head 21. Thus, the substrate 10 disclosed herein has succeeded in improving conventional thermal sheet material which is subject to spontaneous color-development (discoloration) in background from one or more of the reasons previously mentioned. The substrate 10 may also provide for a superior color contrast by the first and second sensitive substrates 12, 16 with the first and second opacifying materials 14, 18 and renders a distinct image through the region 13.

An example to illustrate, but not to limit the invention, includes about 25% by weight of the polymer particles or the one or more opaque polymers or polymer materials in the first and second opacifying materials 14, 18 coating over a color paper substrate. In some embodiments, a protective overprint varnish with higher heat resistance styrene-acrylic having melting point range exceeding that of the polymer particles or the one or more opaque polymers or polymer materials of the first and second opacifying materials 14, 18 and which permits heat to radiate through varnish yet not melt to the print head 21 may be employed.

Figure 2:
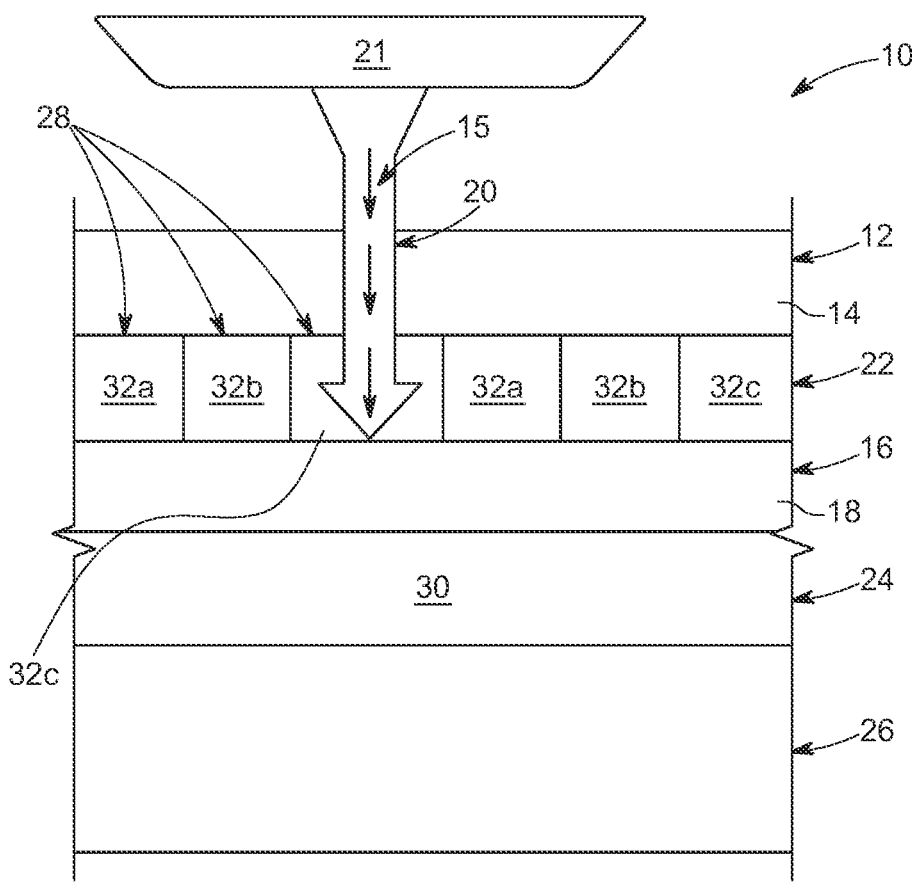
FIG. 2 is a side plan view of a first predetermined energy being applied onto the multi-layered revealable substrate shown in FIG. 1 in accordance with one or more examples of the present disclosure.
Figure 3:
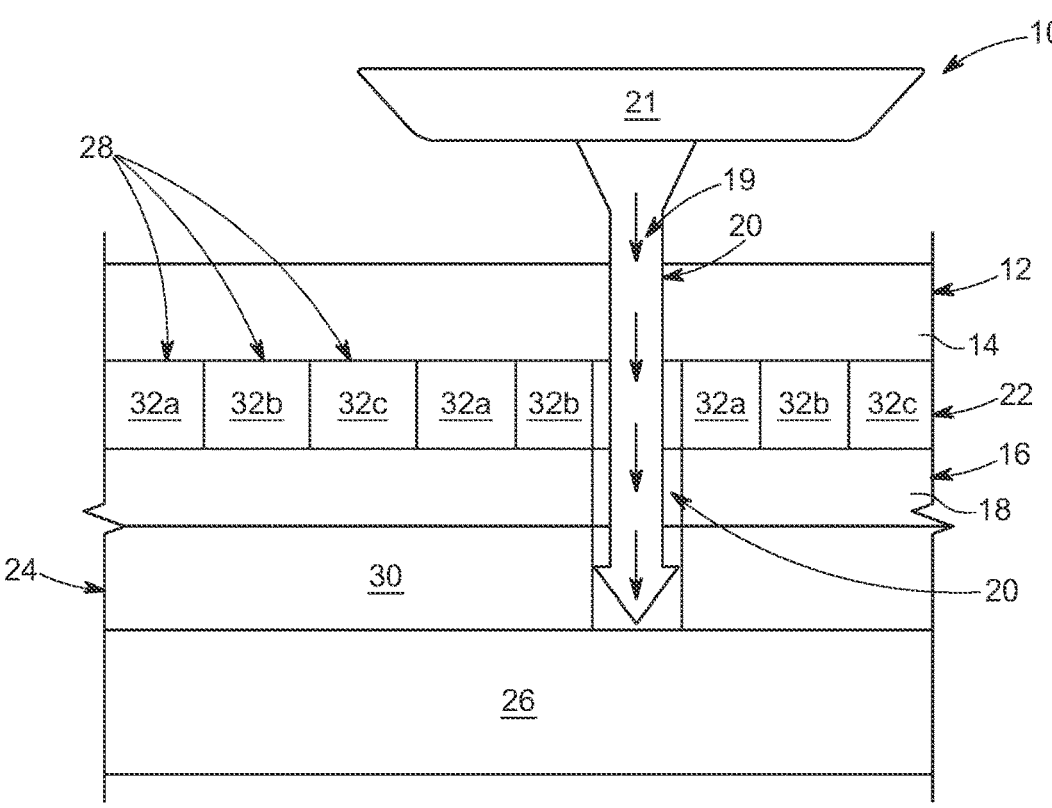
FIG. 3 is a side plan view of a second predetermined energy being applied onto the multi-layered revealable substrate shown in FIG. 1 in accordance with one or more examples of the present disclosure.
Figure 4:
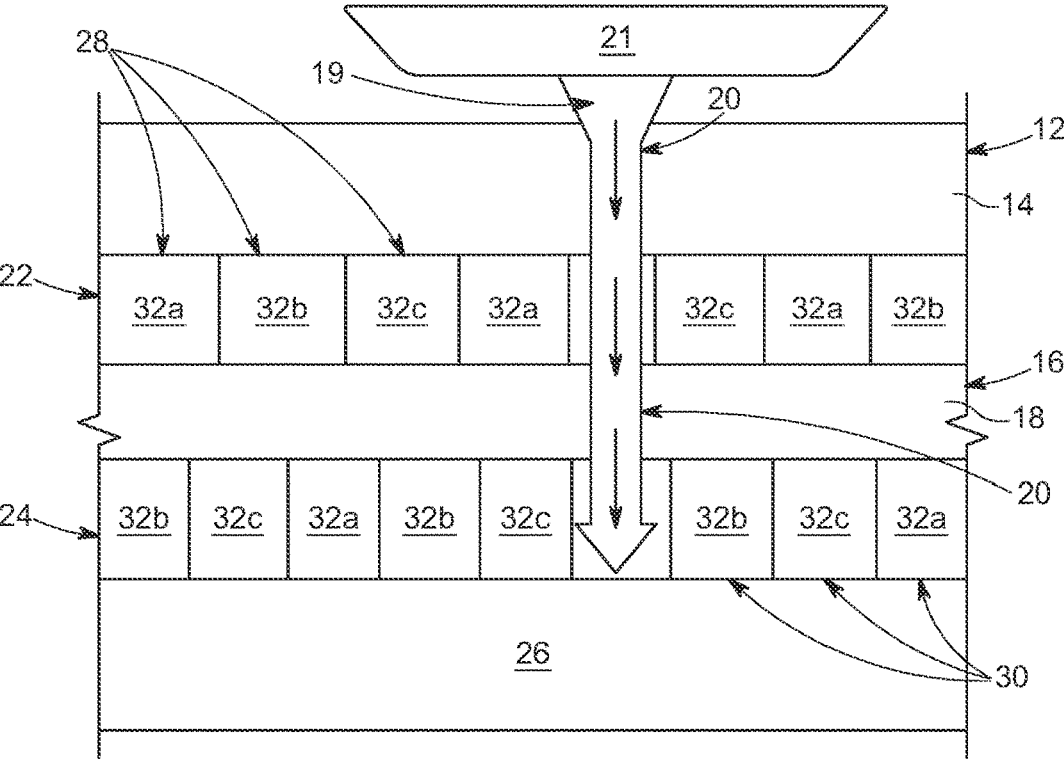
FIG. 4 is a side plan view of a second predetermined energy being applied onto another multi-layered revealable substrate in accordance with one or more examples of the present disclosure.

In FIGS. 1-4, the substrate 10 may comprise the first and second sensitive substrates 12, 16, the first and second opacifying materials 14, 18, the first and second colored layers, the base 26, the first and second colored areas 28, 30, the color blocks 32a, 32b, 32c, or at least one combination thereof. In some embodiments, the print head 21 may apply: the first and second energies 15, 19 onto one or more regions (i.e., at least region 20) of the substrate 10 as shown in FIG. 1; the first energy 15 onto one or more regions (i.e., at least region 20) of the substrate 10 as shown in FIG. 2; and/or the second energy 19 onto one or more regions (i.e., at least region 20) of the substrate 10 as shown in FIGS. 3 and 4. As a result, the first opacifying material 14 of the first sensitive substrate 12 may transition from the opaque state to the transparent state via the first energy 15, as shown in FIGS. 1 and 2, such that the first colored layer 22, the first colored area 28, and/or at least one color block of the color blocks 32a, 32b, 32c (of the first colored area 28) is revealed, visible from the top side of the substrate 10, and/or displayed on the top side of the substrate 10. As shown in FIGS. 2 and 3, the second colored area 30 of the second colored layer 24 may be a single color and/or may exclude the color blocks 32a, 32b, 32c therefrom.

As a result of application of the second energy 19 onto the top side of the substrate 10 via the print head 21, the first and second opacifying materials 14, 18 of the first and second sensitive substrates 12, 16 may transition from the opaque states to the transparent states, as shown in FIGS. 3 and 4, such that: the second colored area 30 of the second colored layer 24 is revealed, visible from the top side of the substrate 10, and/or displayed on the top side of the substrate 10 as shown in FIG. 3; or at least one color block of the color blocks 32a, 32b, 32c (of the second colored area 30) is revealed, visible from the top side of the substrate 10, and/or displayed on the top side of the substrate 10 as shown in FIG. 4. In addition to revealing the second colored area 30 and/or one or more color blocks 32a, 32b, 32c of the second colored area 30, application of the second energy 19 onto at least one region (i.e., at least region 20) reveals the first color area 28 and/or one or more color blocks 32a, 32b, 32c of the first colored area 28 as shown in FIGS. 3 and 4. In at least one embodiment, the first colored area 28 of the first colored layer 24 may be a single color and/or may exclude the color blocks 32a, 32b, 32c therefrom.

In one or more embodiments, the print head 21 may apply the first energy 15 onto at least one first region (i.e. region 20 in FIG. 2) of the substrate 10 and the second energy 19 onto at least one second region (i.e., region 20 in FIG. 3 or 4) of the substrate 10. As a result, the first colored area 28 and/or one or more color blocks 32a, 32b, 32c of the first colored area 28 may be revealed and/or visible at the at least one first region of the substrate 10 and the second colored area 30 and/or one or more color blocks 32a, 32b, 32c of the second colored area 30 may be revealed and/or visible at the at least one second region of the substrate 10. Thus, at least one color or more than one color may be revealed by application of the first and second energies 15, 19 and visible and displayed at the at least one first region and/or the at least one second region of the substrate 10. As a result of the application of the first energy 15 and the second energy 19 onto the substrate 10, a color mixture of a first color material or layer revealed by the application of the first energy 15 and at least one second color materials or layers revealed by the application of the second energy 19 may be revealed and displayed at the portions of the substrate 10. In an embodiment, the first color material or layer may be blue, the at least one second color materials or layers may be yellow, and the color mixture may be green.

In some embodiments, the at least one color or more than one color revealed at or by the first colored layer 22 via the first energy 15 may be improved, modified, enhanced, and/or altered by the at least one color or more than one color revealed at or by the second colored layer 24 via the second energy 19. For example, the at least one color or more than one color revealed by the first colored layer 22 at the region 20 via the first energy 15 may be darkened or brightened by the at least one color or more than one color revealed by the second colored layer 24 at the region 20 via the second energy 19, as shown in FIGS. 3 and 4. Alternatively, the at least one color or more than one color revealed by the first colored layer 22 at the region 20 via the first energy may not be modified (i.e., darkened or brightened) by the at least one color or more than one color of the second colored layer 24 at the region 20 when the second opacifying material 18 of the second sensitive substrate 16 has not transitioned or failed to fully or completely transition from the opaque state to the transparent state (i.e., without application of the second energy 19), as shown in FIG. 2.

In one or more embodiments, each layer, substrate, and/or material selected from the following group may have either a first thickness or at least one second thickness: the first and second sensitive substrates 12, 16, the first and second opacifying materials 14, 18, the first and second colored layers 22, 24, and/or the base 26. The first thickness may be greater than, less than, or equal to the at least one second thickness and/or the at least one second thickness may comprise a plurality of second thicknesses which may each different thicknesses with respect to each other and/or the first thickness. The first and second energies 15, 19 which may be required, necessary, and/or desirable to transition one or more of the first and second sensitive sensitive substrates 12, 16 from a opaque or colored state to the transparent state may be dependent upon the first thickness and/or the at least one second thickness for each of the above-identified layers, substrates, and/or materials. For example, the at least one energy of the first and second energies 15, 19 may be a greater or lesser energy based on the first thickness and/or the one or more second thicknesses of the first and second sensitive substrates 12, 16, the first and second opacifying materials 14, 18, the first and second colored layers 22, 24, and/or the base 26. Moreover, the first thickness and/or the one or more second thicknesses of the first and second sensitive substrates 12, 16, the first and second opacifying materials 14, 18, the first and second colored layers 22, 24, and/or the base 26 may provide the systems and methods disclosed herein with improved color printing and/or imaging that may only be achievable based upon the greater or lesser energies associated with the first and second energies 15, 19.

Figure 5:
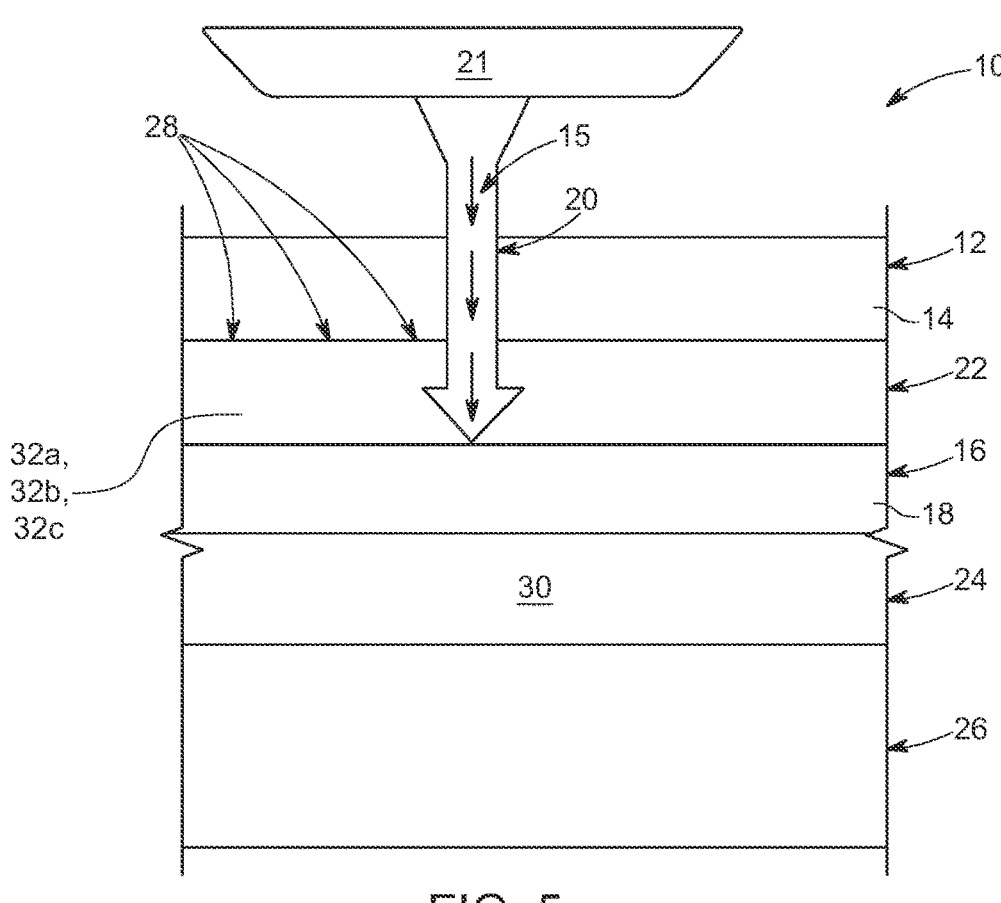
FIG. 5 is a side plan view of a first predetermined energy being applied onto another multi-layered revealable substrate similar to the substrate shown in FIG. 1 in accordance with one or more examples of the present disclosure.

In at least one embodiment, the first colored layer 22 of the substrate 10 may comprise the first colored area 28 and the first colored area 28 may be free of any partitions, any blocks, or any partitioning thereof and comprise the at least one colored ink of any desired color or colors disclosed herein as shown in FIG. 5. In some embodiments, the first colored area 28 of the first colored layer 22 may be, comprise, or consist of a single or sole opaque ink, a single or sole translucent ink, a single or sole colored opaque ink, a single or sole colored translucent and/or transparent ink, or at least one combination thereof. In FIG. 5, the first colored area 28 of the first color layer 22 may comprise, for example, at least one of the at least one first color block 32a, the at least one second color block 32b, the at least one third color block 32c, and a combination thereof.

Figure 6:
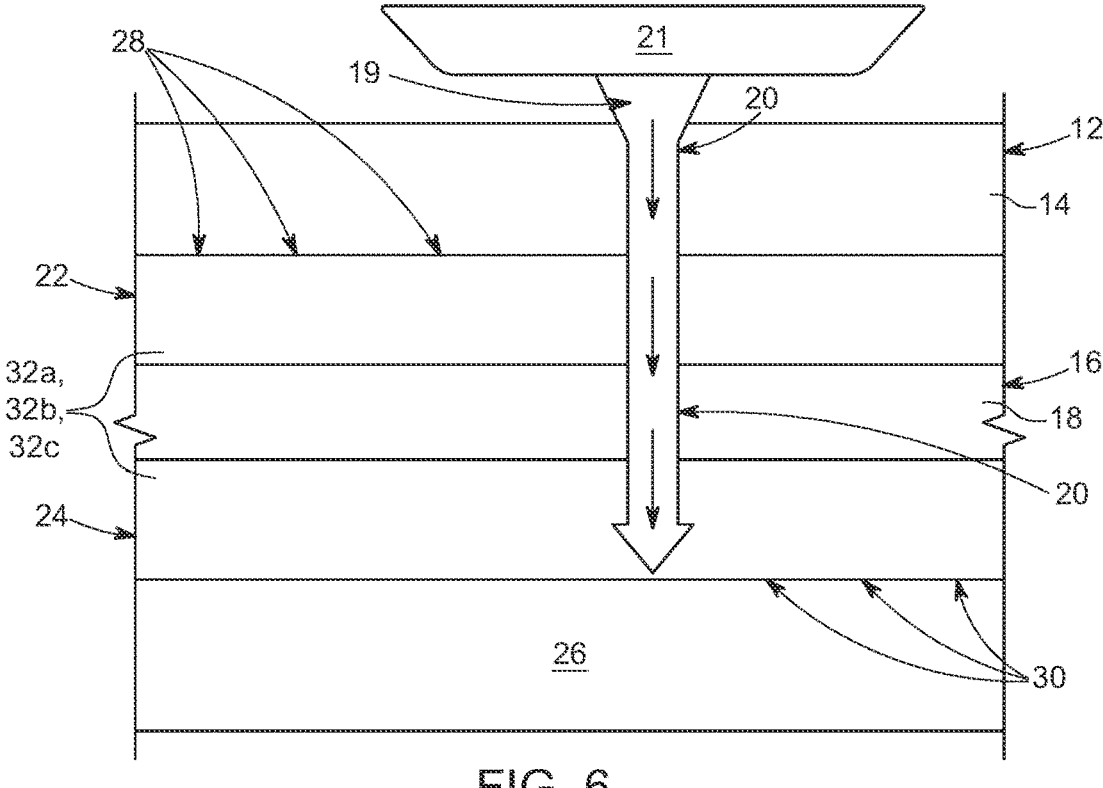
FIG. 6 is a side plan view of a second predetermined energy being applied onto another multi-layered revealable substrate similar to the substrate shown in FIG. 4 in accordance with one or more examples of the present disclosure.

In one or more embodiments, the second color layer of the substrate 10 may comprise the second colored area 30 and the second colored area 30 may be fee of any partitions, any blocks, or any partitioning thereof and comprise at least one colored ink of any desired color or colors disclosed herein as shown in FIG. 6. In some embodiments, the second colored area 30 of the second colored layer 24 may be, comprise, or consist of a single or sole opaque ink, a single or sole translucent ink, a single or sole colored opaque ink, a single or sole colored translucent and/or transparent ink, or at least one combination thereof. In FIG. 6, the first colored area 28 of the first color layer 22 may comprise, for example, at least one of the at least one first color block 32a, the at least one second color block 32b, the at least one third color block 32c, and a combination thereof and the second colored area 30 of the second color layer 24 may comprise, for example, at least one of the at least one first color block 32a, the at least one second color block 32b, the at least one third color block 32c, and a combination thereof.

Figure 7:
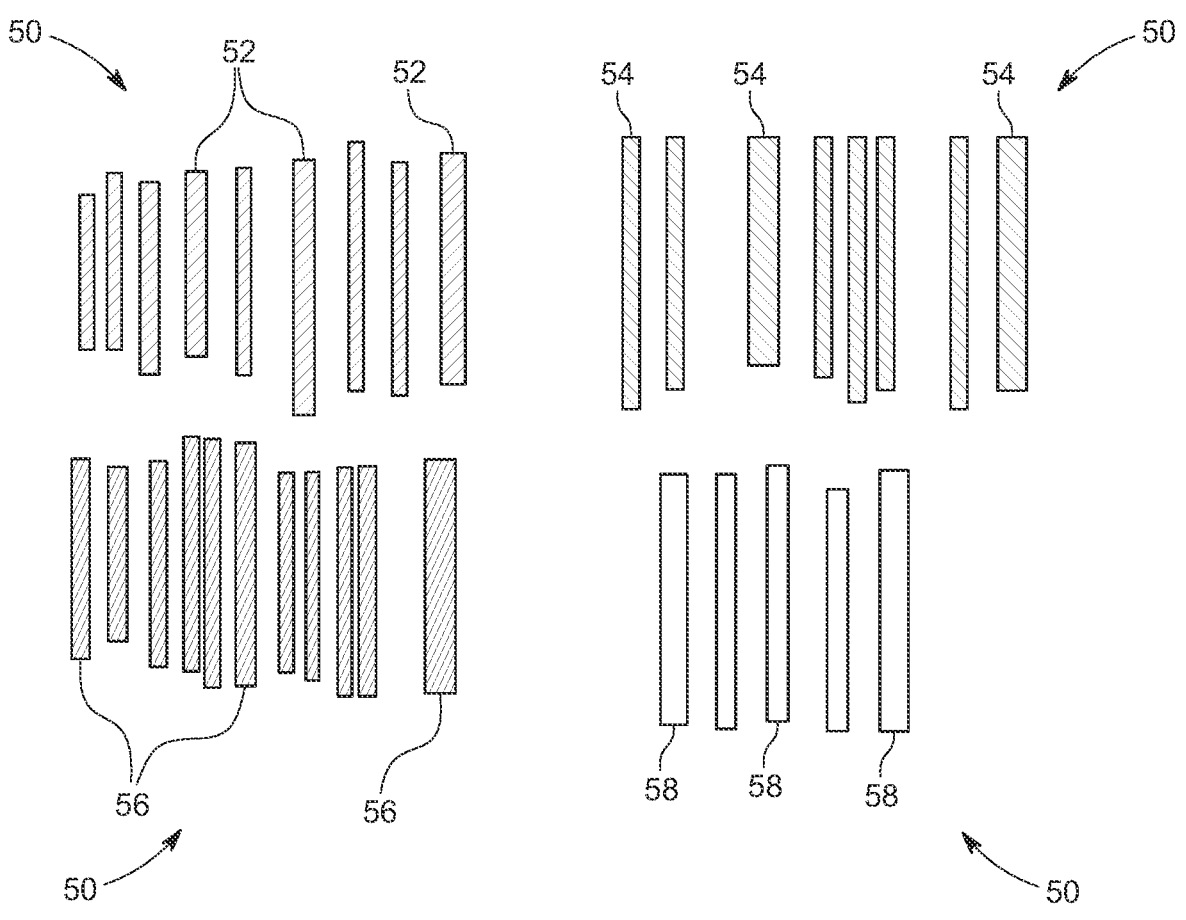
FIG. 7 is a schematic illustration of a plurality of first machine-readable codes, each displaying a different solid color throughout and across the entire code, in accordance with one or more examples of the present disclosure.
Figure 8:
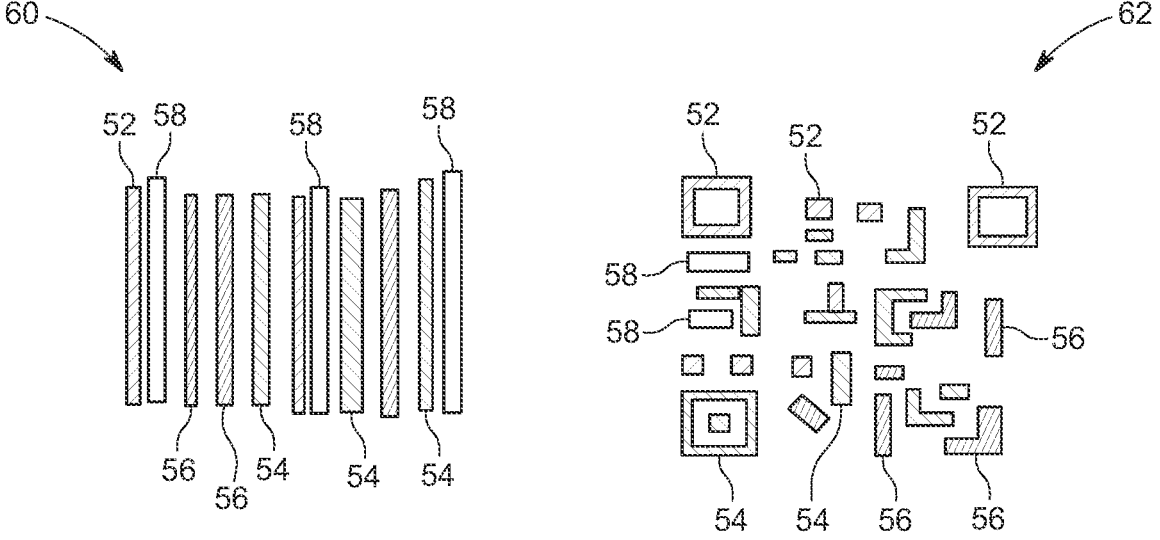
FIG. 8 is a schematic illustration of second and third machine-readable codes, each displaying a mixture of different colors throughout and across the entire code, in accordance with one or more examples of the present disclosure.

In one or more embodiments, at least one or more of the color revealed image(s), the thermally images, the heat revealed image, the distinct image, and/or at least one heat/thermal revealable image (hereinafter collectively referred to as "the revealable/revealed image(s)") associated with the substrate 10 may be, comprise, or consist of at least one first machine-readable code 50 (hereinafter "the first code 50"), as shown in FIG. 7, at least one second machine-readable code 60 (hereinafter "the second code 60"), and/or at least one third machine-readable code 62 (hereinafter "the third code 62"), as shown in FIG. 8. The first code 50, the second code 60, and/or the third code 62 (collectively referred to hereinafter as "the codes, 50, 60, 62") may be, comprise, consist of, and/or include at least one machine-readable barcode which may be at least one linear barcode, at least one matrix 2D barcode, or a combination thereof. In some embodiments, the at least one linear barcode may be, comprise, consist of, and/or include at least one of the following linear barcodes: a postal barcode, a codabar, a "code 25", a "code 11", a "code 32", a "code 39", a "code 49", a "code 93", a "code 128", a CPC binary code, a film barcode, an "EAN 2 code", an "EAN 5 code", and "EAN-8 code" or "EAN-13 code", a facing identification mark code, a "GS1-128 code", a mail code, an "ITF-14 code", an "IFT-6 code", a JAN code, a MSI code, a pharmacode, a Plessey code, a postbar code, a UPC-A code, a UPC-E code, or a combination thereof. In embodiments, the at least one matrix 2D barcode may be, comprise, consist of, and/or include at least one of the following matrix 2D barcodes: AR code, Aztec code, bCode, BEEtag code, BeeTagg code, Bokode code, boxing code, "Code 1", "Code 16K", colorcode, a color construct code, a cronto visual cryptogram code, a cybercode, a d-touch code, a dataglyphs code, a data matrix code, a datastrip code, a digimarc barcode, a digital paper code, a dotcode, DWcode, EZcode, a high capacity color barcode, a huecode, an intercode, a JAB code, a Maxicode, a mCode, a MMCC code, a Nexcode, a "ODF417 code", a Qode, a QR code, a screencode, a Shotcode, a snapcode, a snowflake code, a SPARQCode, a Trilcode, a Voiceye code, or a combination thereof.

In some embodiments, the codes 50, 60, 62 may be, comprise, consist of, and/or include one or more machine-readable images, data, and/or information that may be surrounded by or enclosed within a margin or quiet zone as shown in FIG. 8. For example, the codes 50, 60, 62 may be, comprise, consist of, and/or include one or more quick response codes (hereinafter "the QR codes"). In embodiments, the codes 50, 60, 62 may be, comprise, consist of, and/or include at least one "Model 1 QR code", at least one Micro QR code, at least one IQR code, at least one Secure QR code, at least one Frame QR code, at least one HCC2D code, at least one JAB code, or a combination thereof. In an embodiment, the codes 50, 60, 62 may be square-shaped, rectangular-shaped, triangular-shaped, circular- or oval-shaped, or a combination thereof. The codes 50, 60, 62 may comprise and/or include one or more code structure elements, such as, for example, position detection patterns, and/or data area that may be surrounded by or in close by the margin. In some embodiments, the position detection patterns and/or data area may comprise at least one selected from version information, format information, and/or error correction keys and/or requirement patterns. In embodiment, the required patterns make comprise at least one of a physical element, an alignment element, a timing element, or a combination thereof. The code structure elements may be and/or may comprise one or more positioning detection markers, one or more alignment markings, one or more timing patterns, version information, format information, one or more data and error correction keys, at least one quite zone (i.e., the margin), or a combination thereof. Additionally, the code structure elements may be and/or may comprise at least one static QR code type, at least one dynamic QR code type, or a combination thereof. In an embodiment, the at least one static QR code type may be or may comprise at least one QR code selected from at least one Wi-Fi QR code, at least one cryptocurrency address QR code, at least one plain text QR code, at least one email QR code, at least one online login QR code, at least one online promotional QR code, or a combination thereof. The at least one dynamic QR code type may be or may comprise at least one QR code selected from at least one App Store QR code, at least one PDF QR code, at least one social media QR code, at least one coupon QR code, at least one reward QR code, at least one promotion QR code, at least one gift QR code, at least one discount QR code, at least one business page QR code, at least one vCard plus QR code, at least one video QR code, at least one dynamic URL QR code, at least one image gallery QR code, at least one event QR code, at least one MP3 QR code, at least one feedback QR code, at least one rating QR code, or a combination thereof.

In one or more embodiments, the first code 50 may be, comprise, consist of, and/or display a single or sole solid color throughout and across the first code 50 in its entirety. As shown in FIG. 7, the first code 50 may be, comprise, consist of, and/or display, for example, a first color 52, a second color 54, a third color 56, or a fourth color 58. Additionally, the first color 52, the second color 54, the third color 56, and the fourth color 58 are each different solid colors with respect to each other. In embodiments, the solid colors may be any known color. For example, the first color 52 may be black, the second color 54 may be green, the third color 56 may be blue, and/or the fourth color 58 may be white, as shown in FIG. 7.

In some embodiments, the second code 60 and the third code 62 may be, comprise, consist of, and/or display mixtures of different colors throughout and across the second code 60 and the third code 62, in their respective entireties, as shown in FIG. 8. In at least one embodiment, the second code 60 may be a machine-readable barcode and/or the third code 62 may be a machine-readable QR code. Each of the mixtures of different colors of the second code and/or the third code 62 may be, comprise, consist of, and/or display the first color 52, the second color 54, the third color 56, and/or the fourth color 58 (collectively referred to hereinafter as "the colors 52, 54, 56, 58"). In some embodiments, the mixtures of different colors may comprise one or more additional different colors beyond or besides the colors 52, 54, 56, 58. The number of different colors in the mixtures of different colors may be any number of different colors (i.e., more or less colors than colors 52, 54, 56, 58) as known to a skilled artisan.

In one or more embodiments, one or more benefits and/or advantages of direct thermal printing colors on demand using methods/processes disclosed herein and in U.S. Provisional Patent Application No. 63/382,807 may be achievable and/or provided with one or more images of pictures (i.e., the codes 50, 60, 62) showing various colors (i.e., colors 52, 54, 56, 58) and shades, solid color differentiation along with the present imaging disclosed herein of barcodes and/or QR codes (i.e., codes 50, 60, 62) in either multiple solid colors as shown in FIG. 7 that are all the same in the codes 50 or in mixtures of different colors (i.e., colors 52, 54, 56, 58).

In some embodiments, the different solid colors (i.e., colors 52, 54, 56, 58) may allow or provide for easy recognition for both a human eye as well as a machine-readable scanner. The different solid colors may, for example, represent or be indicative of another means of differentiation. In at least one example, an attendee at a conference may have a revealed barcode or QR code on a badge of the attendee for entry to a particular hall or meeting space or location that may be scanned, but the visible color difference may alert a conference organizer to a level of access that is actually allowed for the individual. For example, the first color 52 may represent or be indicative of level 1 and/or initial, minimal, or standard accessibility, the second color 54 may represent or be indicative of level 2 and/or first intermediate or silver service accessibility, the third color 56 may represent or be indicative of level 3 or second intermediate or gold service accessibility, and/or the fourth color 58 may represent or be indicative of level 4 and/or final, maximum, or platinum service accessibility.

The mix of the different colors in the lines (for the barcodes) and the square blocks (in the QR codes), as shown in FIG. 8, may allow for more additional information than known barcodes and/or QR codes. For example, not only the width of the line or the position of the squares may be relevant to the additional information, but also the color(s) may provide, contain, comprise, consist of, or display the additional information. As a result of the colors 52, 54, 56, 58, more combinations of both the width between lines (for bar codes) and/or the color of the lines and/or a location of the square and the color of the square (for QR codes) are provided by the codes 50, 60, 62.

Accordingly, it has been determined that addition of 3 colors (i.e., three colors selected from colors 52, 54, 56, 58) may increase the number of different QR codes possible by a factor of about 4. Such increase by a factor of about 4 may be relevant and important as the rise in use for these codes may be reaching capacity with respect to known barcodes and QR codes.

Prior to the present disclosure directed to thermal imaging in multiple colors anywhere on the substrate 10 as set forth herein, such multi-color barcodes and QR codes were limited to inkjet, laser, or the more traditional processes of Flexo, screen printing or gravure, etc. However, the material and/or printers or imaging devices disclosed herein achieve on demand thermal imaging in multiple colors on the substrate 10 disclosed herein without necessity of ink and/or toner in a portable, quick, and easy digital print right at the source of need. In one or more embodiments, the substrate 10 configured for thermal imaging in multiple colors may be, comprise, and/or consist of at least one labeling item, at least one ticketing item and/or at least one sales receipt. Known scanners read only the contrast between two colors which are traditionally black and white. However, with the use of optical color sensors, such as the optical color sensors and sensing methods disclosed in the '440 patent for improving color imaging and print head alignment, coordination, registration, and/or re-registration, the present solid colors and mixtures of colors disclosed herein allow for the more additional information in about the same or about substantially the same amount space associate with the barcodes and QR codes.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A multi-layered revealable substrate comprising:
a first layer of a first opacifying material;
a first color material disposed on a first side of the first layer of the first opacifying material, wherein the first layer of the first opacifying material covers the first color material and the first color material is at least one first ink comprising one or more first colors;
a second layer of a second opacifying material disposed on a side of the first color material that is located opposite with respect to the first layer of the first opacifying material; and
a second color material disposed on the second layer of the second opacifying material, wherein the second layer of the second opacifying material is disposed between the first color material and the second color material and the second color material is at least one second ink comprising one or more second colors, wherein
the first opacifying material is configured to, upon application of first predetermined energy, change from the opaque state to a transparent state to reveal at least a portion of the first color material underneath the first opacifying material,
the second opacifying material is configured to, upon application of second predetermined energy, change from the opaque state to a transparent state to reveal at least a portion of the second color material underneath the second opacifying material, and
the first predetermined energy is a different predetermined energy than the second predetermined energy.

2. The revealable substrate of claim 1, wherein at least one of the first predetermined energy and the second predetermined energy is predetermined light and/or laser energy.

3. The revealable substrate of claim 1, wherein both energies of the first predetermined and second predetermined energies are predetermined light and/or laser energies.

4. The revealable substrate of claim 1, wherein the second predetermined energy is greater than the first predetermined energy.

5. The revealable substrate of claim 4, wherein the first and second predetermined energies consist of light and/or laser energies.

6. The revealable substrate of claim 1, further comprising:
a base substrate backing to which the second color material is coupled.

\* \* \* \* \*